(12) United States Patent
Millet et al.

(10) Patent No.: US 11,518,322 B2
(45) Date of Patent: Dec. 6, 2022

(54) VARIABLE GEOMETRY BOOM FOR AN ELECTRICAL HARNESS, AND AIRCRAFT COMPRISING SUCH A BOOM

(71) Applicant: Airbus Operations SAS, Toulouse (FR)

(72) Inventors: Gérard Millet, Toulouse (FR); Vincent Delpy, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/463,803

(22) Filed: Sep. 1, 2021

(65) Prior Publication Data

US 2022/0063525 A1 Mar. 3, 2022

(30) Foreign Application Priority Data

Sep. 3, 2020 (FR) ...................................... 2008925

(51) Int. Cl.
*B60R 16/02* (2006.01)
(52) U.S. Cl.
CPC ....... *B60R 16/0215* (2013.01); *B60Y 2200/50* (2013.01)
(58) Field of Classification Search
CPC .................. B60R 16/0215; B60Y 2200/50
USPC ....................................................... 174/72 A
See application file for complete search history.

(56) References Cited

U.S. PATENT DOCUMENTS

| 5,388,790 A | 2/1995 | Guthke et al. |
| 2012/0037418 A1 | 2/2012 | Zyrull et al. |
| 2014/0299720 A1* | 10/2014 | Robrecht ................ B60R 16/02 248/72 |
| 2015/0285407 A1 | 10/2015 | Aragon et al. |

FOREIGN PATENT DOCUMENTS

| DE | 102009022796 | * 12/2010 |
| FR | 2962716 A1 | 1/2012 |

OTHER PUBLICATIONS

French Search Report; priority document.

* cited by examiner

*Primary Examiner* — Timothy J Thompson
*Assistant Examiner* — Michael F McAllister
(74) *Attorney, Agent, or Firm* — Greer, Burns & Crain, Ltd.

(57) ABSTRACT

A boom for an electrical harness, including a straight bar extending in a longitudinal direction, and several supports distributed along and attached to the bar, to which supports at least one electrical harness is connected in operation. The bar includes at least two parts configured to slide relative to one another in the longitudinal direction so that a length of the bar can be adjusted.

10 Claims, 3 Drawing Sheets

Fig. 7
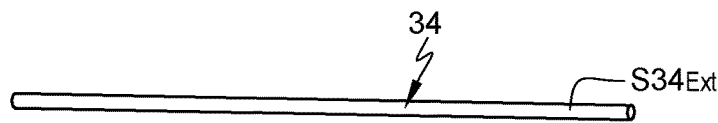
Fig. 8
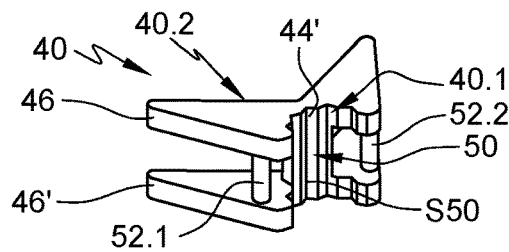
Fig. 9
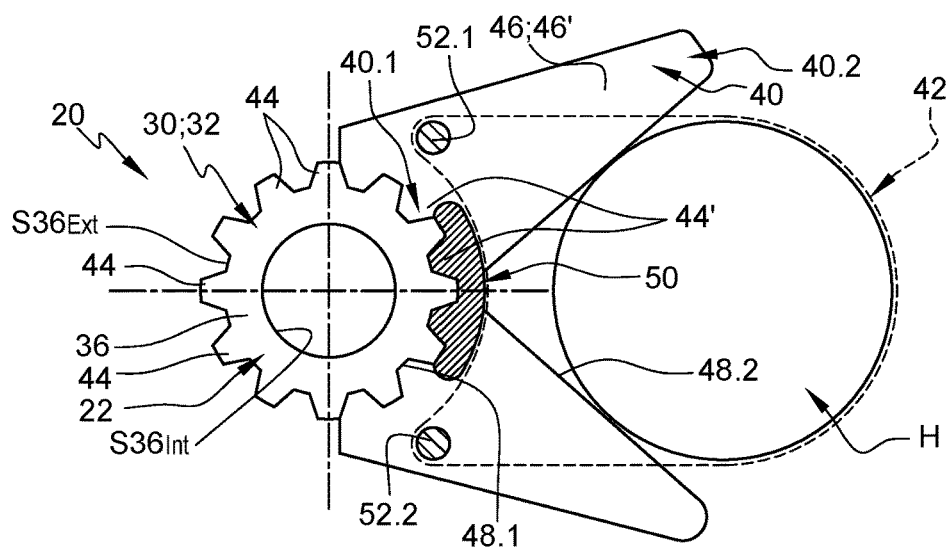
Fig. 10
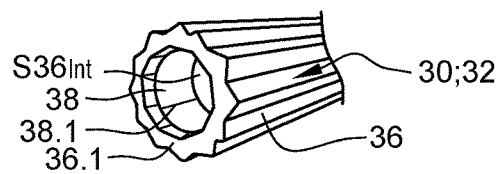
Fig. 11      Fig. 12
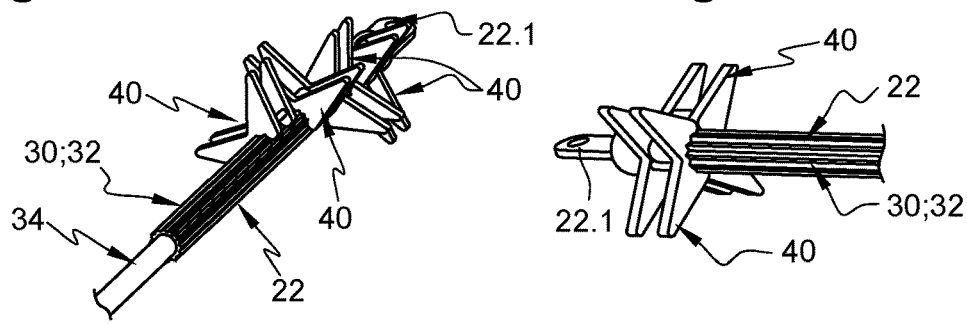

VARIABLE GEOMETRY BOOM FOR AN ELECTRICAL HARNESS, AND AIRCRAFT COMPRISING SUCH A BOOM

CROSS-REFERENCES TO RELATED APPLICATIONS

This application claims the benefit of the French patent application No. 2008925 filed on Sep. 3, 2020, the entire disclosures of which are incorporated herein by way of reference.

FIELD OF THE INVENTION

The present application concerns a variable geometry boom for an electrical harness, and to an aircraft comprising at least one such boom.

BACKGROUND OF THE INVENTION

According to an embodiment shown on FIGS. 1 and 2, a boom 10 supporting an electrical harness 12 comprises a straight bar 14 of fixed length, which is connected at each end to a support (not shown) by means of fixing elements 14.1, 14.2, and several supports 16 fixed to the bar 14 and allowing the electrical harness 12 to be attached to the bar 14 by means of, for example, hose clamps 18 of the self-blocking type. As illustrated in FIG. 2, the supports 16 and the bar 14 form a single piece.

For each model of boom 10, the length LO of the bar 14 is fixed, the number of supports 16 is fixed, and their position and orientation relative to the bar 14 are fixed.

In practice, since the distance separating the fixing elements 14.1, 14.2 varies as a function of the position of the bar 14 in the aircraft, the length of the bar 14 varies from one boom to another. Similarly, the path taken by the electrical harness varies as a function of the position of the electrical harness in the aircraft, so the orientation and position of the supports vary from one boom to the next.

Consequently, it is necessary to provide a large number of boom models, each boom model comprising a bar of a specific length and supports 16 positioned and oriented in a specific fashion.

A large number of models requires considerable storage space and costs, and a complex supply management.

The present invention aims to remedy some or all of the drawbacks of the prior art.

SUMMARY OF THE INVENTION

To this end, an object of the invention is a boom for an electrical harness, comprising a straight bar extending in a longitudinal direction and having first and second ends configured so they can be removably attached to at least one support during operation, and several supports distributed along and attached to the bar, to which supports, at least one electrical harness is attached in operation. According to the invention, the bar comprises at least two parts configured so as to slide relative to one another in the longitudinal direction, a first part being attached to the first end and a second part being attached to the second end, at least one of the first and second parts comprising a tube having an outer surface provided with longitudinal splines which extend over almost the entire length of the tube and are evenly distributed over its entire circumference.

Due to the sliding between the first and second parts, the length of the bar of the boom may vary and be adjusted as a function of the distance separating the fixing elements provided for attaching the first and second ends of the bar to the support.

According to another characteristic, at least one support is attached to one of the parts of the bar by a removable connection.

According to another characteristic, the bar comprises a first part having the first end, a second part having the second end, and an intermediate part interposed between the first and second parts and sliding relative to at least one of the first and second parts.

According to another characteristic, the first and second parts are identical and each comprises a tube having an outer surface, an inner surface and a first open end via which the intermediate part is introduced, the latter having an outer surface enabling it to slide in the tube of the first or second part.

According to another characteristic, the outer surface of the intermediate part has a circular cross-section, and the inner surface of the tube of the first or second part has a circular cross-section identical to that of the outer surface of the intermediate part.

According to another characteristic, the boom comprises a seal which is integral with the first or second part and positioned in the tube on the inner surface close to its first end.

According to another characteristic, the support is made from one piece and comprises a first zone having a surface of shape complementary to that of the outer surface of the tube of the first or second part of the bar, in order to removably connect the support and the first or second part.

According to another characteristic, the support comprises two identical wings positioned in the transverse planes during operation and spaced apart from one another, and at least one joining element for connecting the two wings, each wing comprising a first arcuate edge having a shape complementary to that of the outer surface of the tube of each of the first and second parts.

According to another characteristic, the support comprises first and second clamping jaws and a connecting element allowing connection of the first and second clamping jaws so that they clamp the first or second part of the bar.

An object of the invention is also an aircraft comprising at least one boom for a harness according to any of the preceding characteristics.

BRIEF DESCRIPTION OF THE DRAWINGS

Further characteristics and advantages will arise from the following description of the invention, which is given purely as an example, and with reference to the appended drawings in which:

FIG. 7 is a side view of an intermediate part of a boom for an electrical harness, illustrating an embodiment of the invention, FIG. 8 is a perspective view of a support, illustrating a first embodiment of the invention, FIG. 9 is a cross-section through the support shown on FIG. 8 and the first part of a boom shown on FIG. 6, FIG. 10 is a perspective view of one end of the first part of a boom, illustrating an embodiment of the invention, FIG. 11 is a perspective view of supports positioned in various orientations, illustrating different configurations of the boom shown on FIG. 5, FIG. 12 is a perspective view of two supports positioned diametrically opposite one another, illustrating one configuration of the invention.

DETAILED DESCRIPTION OF THE PREFERRED EMBODIMENTS

Figure 1:
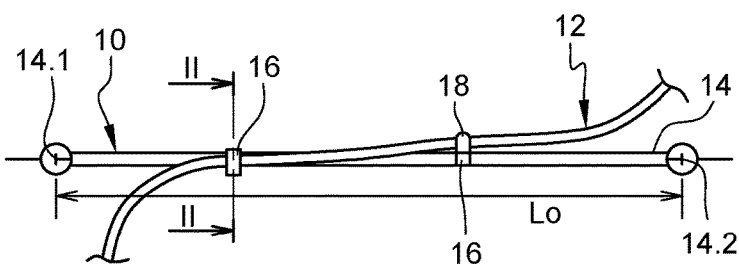
FIG. 1 is a side view of a boom supporting an electrical harness, illustrating an embodiment of the prior art.
Figure 2:
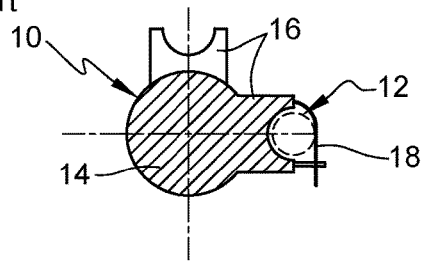
FIG. 2 is a cross-section along line II-II of FIG. 1.
Figure 3:
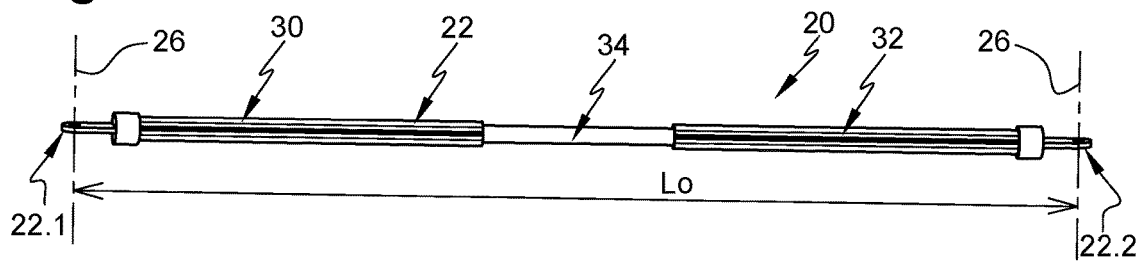
FIG. 3 is a side view of a boom for an electrical harness without support, illustrating an embodiment of the invention.
Figure 4:
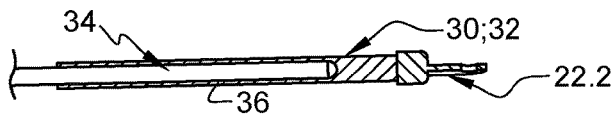
FIG. 4 is a longitudinal section of part of the boom shown on FIG. 3.
Figure 5:
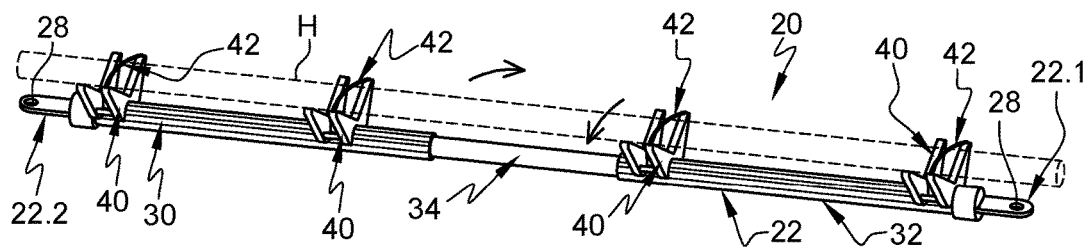
FIG. 5 is a perspective view of a boom for an electrical harness equipped with supports, illustrating an embodiment of the invention.
Figure 6:
FIG. 6 is a perspective view of a first part of a boom for an electrical harness, illustrating an embodiment of the invention.
Figure 16:
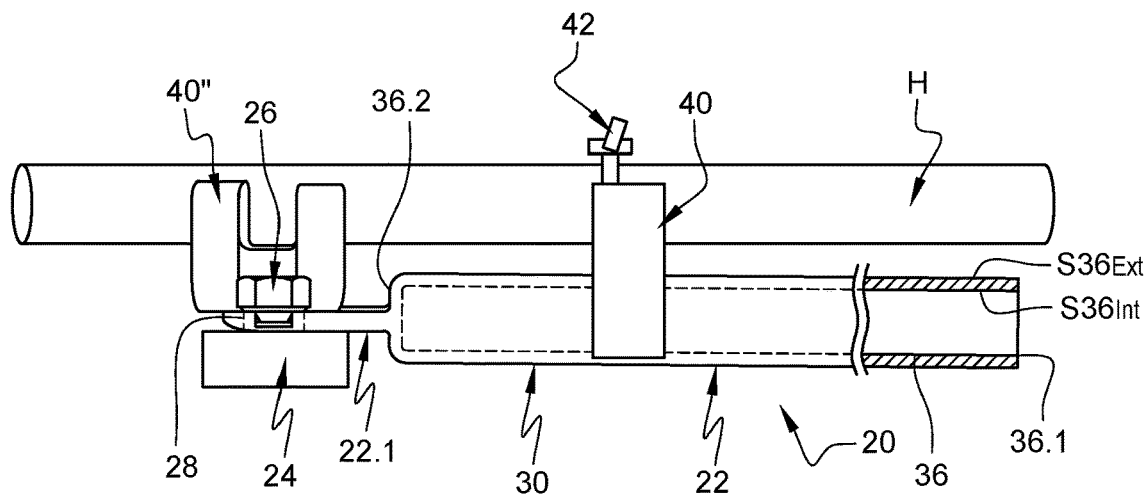
FIG. 16 is a side view of a part of a boom, illustrating another embodiment.

According to the embodiment shown on FIGS. 5, 9 and 16, a boom 20, positioned in a vehicle such as an aircraft, provides support for an electrical harness H (shown on FIGS. 5, 9 and 16).

An electrical harness means one or more electrical cable(s) grouped along a cable path.

The boom 20 comprises a substantially straight bar 22 having first and second ends 22.1, 22.2 which are removably attached to at least one support 24 (shown on FIG. 16) by fixing elements 26. According to one embodiment, at each of its first and second ends 22.1, 22.2, the bar 22 comprises an eyelet 28 (visible on FIG. 5). Each of its fixing elements 26 takes the form of a screw passing through the eyelet 28 and screwing into the support 24, as illustrated on FIG. 16. Naturally, the invention is not limited to this embodiment for providing the connection between the bar 22 and the support 24.

In the remainder of the description, a longitudinal direction corresponds to a direction passing through the fixing elements 26 provided at the first and second ends 22.1, 22.2 of the bar 22 of the boom 20. A transverse plane is a plane perpendicular to the longitudinal direction.

The bar 22 extends in the longitudinal direction and has a length LO, measured in the longitudinal direction and equal to the distance separating the fixing elements 26 provided at the first and second ends 22.1, 22.2 of the bar 22.

The bar 22 comprises at least two parts 30, 32 which are configured so as to slide relative to one another in the longitudinal direction, a first part 30 being attached directly or indirectly to the first end 22.1, and a second part 32 being attached directly or indirectly to the second end 22.2. Due to the sliding between the first and second parts 30, 32, the length LO of the bar 22 of the boom 20 may vary and be adjusted to the distance separating the fixing elements 26 provided at the first and second ends 22.1, 22.2 of the bar 22.

In an embodiment shown on FIGS. 3 to 7, the bar 22 comprises a first part 30 having the first end 22.1, a second part 32 having the second end 22.2, and a third part known as the intermediate part 34 interposed between the first and second parts 30, 32 and sliding relative to a least one of the first and second parts 30, 32.

In a first configuration, each of the first and second parts 30, 32 is configured so as to slide relative to the intermediate part 34.

In a second configuration, the second part 32 and the intermediate part 34 are fixed relative to one another, and the first part 30 is configured so as to slide relative to the intermediate part 34.

According to one embodiment, the first and second parts 30, 32 are identical. As illustrated on FIG. 16, each of the first and second parts 30, 32 comprises a tube 36 having an outer face S36Ext, and inner face S36Int with a cross-section which is substantially constant over its length, a first open end 36.1 via which the intermediate part 34 is inserted, and a second closed end 36.2 to which the eyelet 28 is attached.

In addition, as illustrated on FIG. 7, the intermediate part 34 is an elongate element and comprises an outer surface S34Ext with a cross-section which is substantially constant over its length and approximately equal to the cross-section of the inner surface S36Int of the tube 36, so as to allow the intermediate part 34 to slide in the tube 36 of the first or second part 30, 32.

The intermediate part 34 may be solid or hollow.

According to one embodiment, the cross-section of the outer surface S34Ext of the intermediate part 34 and the cross-section of the inner surface S36Int of the tube 36 of the first or second part 30, 32 have an identical circular cross-section. This solution allows the first or second part 30, 32, or both, to pivot relative to the intermediate part 34 about a pivot axis congruent with the axis of revolution of the intermediate part 34 or of the tube 36 of the first or second part 30, 32.

According to one embodiment, a seal 38 is interposed between the movable parts of the bar 22. In a configuration shown on FIG. 10, a seal 38 is integral with the first or second part 30, 32 and positioned in the tube 36 on the inner surface S36Int, close to its first end 36.1. This seal 38 limits the ingress of fluid inside the tube 36. It also allows any vibrations to be absorbed. In one configuration, the seal 38 has a longitudinal slot 38.1 to allow air to enter or leave the tube 36 during sliding of the first or second part 30, 32 and the intermediate part 34 relative to one another. This slot 38.1 is configured to allow the passage of air and limit the passage of a liquid inside the tube 36.

The boom 30 comprises several supports 40 distributed along and attached to the bar 22. The electrical harness H is attached to various supports 40 via connections 42, which are, for example, identical to those of the prior art.

According to one arrangement, the supports 40 are positioned on the first and second parts 30, 32 and not positioned on the intermediate part 34, so as to allow the sliding of at least one of the first and second parts 30, 32 relative to the intermediate part 34.

At least one support 40 is attached to one of the parts 30, 32, 34 of the bar 22 by a removable connection, so as to allow adjustment of the positioning and orientation of each support 40 of the bar 22 of the boom 20.

According to a first embodiment shown on FIGS. 5, 8, 9, 11 and 12, the support 40 is made from one piece.

In a configuration shown on FIG. 9, the outer surface S36Ext of the tube 36 of each of the first and second parts 30, 32 has longitudinal splines 44 which extend over almost the entire length of the tube 36 and are evenly distributed over its entire circumference. As an indication, each of the first and second parts 30, 32 comprises twelve splines 44.

According to this first embodiment, the support 40 comprises a first zone 40.1 configured to allow the removable connection to the bar 22 of the boom 20, and a second zone 40.2 configured to receive the electrical harness H and position it along a desired cable path, wherein a connection 42 is provided for connecting the electrical harness H and the support 40.

The first zone 40.1 of the support 40 comprises a surface of shape complementary to that of the outer surface S36Ext of the tube 36 of each of the first and second parts 30, 32, so as to allow the removable connection to the first or second part 30, 32 of the bar 22.

According to a configuration shown on FIGS. 8 and 9, the support 40 comprises two identical wings 46, 46' which are positioned in transverse planes during operation and spaced apart from one another, each wing 46, 46' having a first arcuate edge 48.1 of shape complementary to that of the outer surface S36Ext of the tube 36 of each of the first and second parts 30, 32, and a second edge 48.2, for example V-shaped, forming a housing for an electrical harness H.

The support 40 comprises at least one joining element for connecting the two wings 46, 46'. In one configuration, the support 40 comprises a central joining element 50 having a curved surface S50 with an arcuate section, positioned in the extension of the first edges 48.1 of the two wings 46, 46', and two lateral joining elements 52.1, 52.2 arranged on either side of the central joining element 50 and, for example, cylindrical in form, allowing attachment of a connector 42, such as a self-blocking hose clamp, for example.

When the outer surface S36Ext of the tube 36 comprises splines 44, the first edge 48.1 of each wing 46, 46' and the curved surface S50 of the central joining element 50 also comprise splines 44' complementary to those of the tube 36.

According to this first embodiment, each of the supports 40 may clip onto the first or second part 30, 32 with elastic deformation, and/or may be threaded on from one end of the first or second part 30, 32.

As illustrated in FIG. 11, the support 40 may be oriented in various ways around the first or second part 30, 32 and positioned at various locations along the first or second part 30, 32. Furthermore, as illustrated in FIG. 12, two supports 40 may be positioned diametrically opposite one another on the first or second part 30, 32 and provide support for two electrical harnesses arranged on either side of the first or second part 30, 32.

In operation, each support 40 is blocked in rotation relative to the first or second part 30, 32 due to the splines 44, 44', and blocked in translation along the first or second part 30, 32 due to friction between the support 40 and the first or second part 30, 32.

Figure 13:
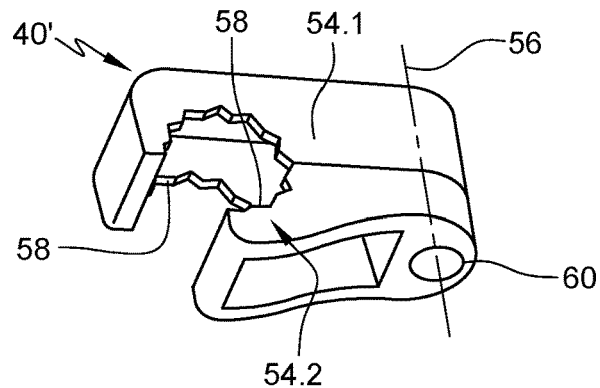
FIG. 13 is a perspective view of a support, illustrating a second embodiment of the invention.
Figure 14:
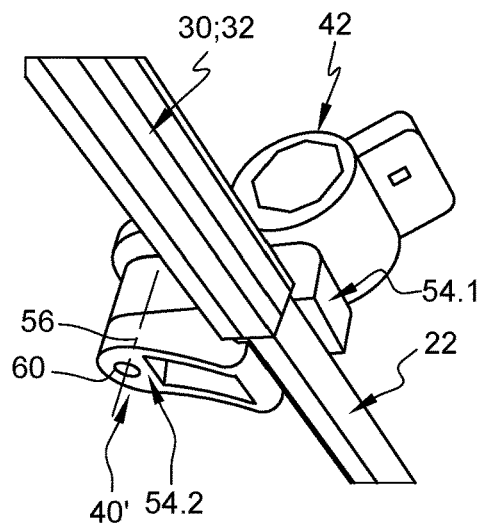
FIG. 14 is a perspective view of a boom equipped with the support shown on FIG. 13, from a first viewing angle.
Figure 15:
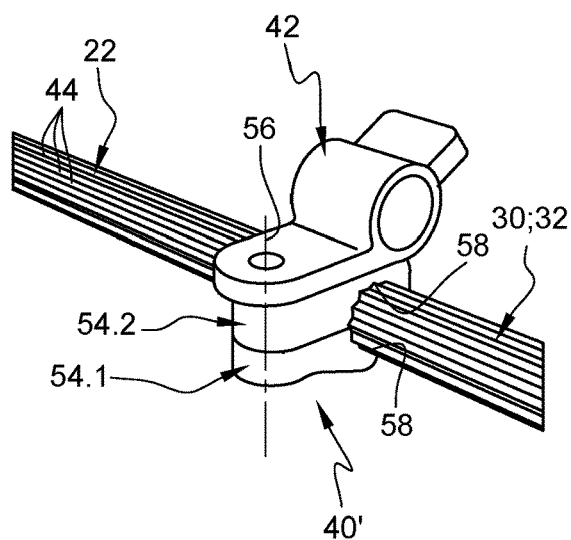
FIG. 15 is a perspective view of a boom equipped with the support shown on FIG. 13, from a second viewing angle.

According to a second embodiment shown on FIGS. 13 to 15, the support 40' comprises first and second clamping jaws 54.1, 54.2, and a connecting element 56 allowing connection of the first and second clamping jaws 54.1, 54.2 so that they clamp the first or second part 30, 32.

According to the second embodiment, the first and second parts 30, 32 may be identical to those of the first embodiment and comprise splines. In addition, the first and second clamping jaws 54.1, 54.2 each have a curved portion 58 provided with splines, and a through hole 60 for housing the connecting element 56.

In one configuration, the electrical harness H is attached to the support 40' by a connector such as a rigid clamp, for example, which is itself attached to the support 40' by means of the connecting element 56.

Naturally, the invention is not limited to the first and second embodiments for the supports. Other solutions may be considered. In addition, the supports are not necessarily positioned on the first and second parts 30, 32. Thus, as shown on FIG. 16, certain supports 40 may be positioned on the first or second part 30, 32, while at least one other support 40" is positioned at one of the first and second ends 22.1, 22.2 of the bar 22 of the boom 20 and attached thereto by means of one of the fixing elements 26.

According to the invention, using three component models—a first model corresponding to the first and second parts 30, 32, a second model corresponding to the intermediate part 34, and a third model corresponding to supports 40—it is possible to obtain a large number of variants of booms 20, each having an adaptable length and each provided with supports, the orientation and position of which may be adapted.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A boom for an electrical harness, comprising:
 a straight bar extending in a longitudinal direction and having a first end and a second end configured so the first end and the second end can be removably attached to at least one support during operation, and
 several supports distributed along and attached to the bar, to which supports at least one electrical harness is attached in operation,
 wherein the bar comprises at least two parts configured so as to slide relative to one another in the longitudinal direction, a first part being attached to the first end and a second part being attached to the second end, at least one of the first part and the second part comprising a tube having an outer surface provided with longitudinal splines which extend over most of an entire length of the tube and are evenly distributed over its entire circumference.

2. The boom for an electrical harness as claimed in claim 1, wherein at least one support is attached to one of the at least two parts of the bar by a removable connection.

3. The boom for an electrical harness as claimed in claim 1, wherein the bar comprises the first part having the first end, the second part having the second end, and an intermediate part interposed between the first part and the second part and sliding relative to at least one of the first part and the second part.

4. The boom for an electrical harness as claimed in claim 3, wherein the first part and the second part are identical and each comprises a tube having an outer surface, an inner surface and a first open end via which the intermediate part is introduced, the intermediate part having an outer surface enabling the intermediate part to slide in the tube of the first part or the second part.

5. The boom for an electrical harness as claimed in claim 4, wherein the outer surface of the intermediate part has a circular cross-section, and the inner surface of the tube of the first part or the second part has a circular cross-section identical to that of the outer surface of the intermediate part.

6. The boom for an electrical harness as claimed in claim 4, wherein the boom comprises a seal which is integral with the first part or the second part and positioned in the tube on the inner surface close to the first end of the tube.

7. The boom for an electrical harness as claimed in claim 1, wherein the support is made from one piece and comprises a first zone having a surface of shape complementary to that of the outer surface of the tube of the first part or the second part of the bar, to removably connect the support and the first or second part.

8. The boom for an electrical harness as claimed in claim 7, wherein the support comprises two identical wings positioned in transverse planes during operation and spaced apart from one another, and at least one joining element for connecting the two wings, each wing comprising a first arcuate edge having a shape complementary to that of the outer surface of the tube of each of the first and second parts.

9. The boom for an electrical harness as claimed in claim 2, wherein the support comprises first and second clamping jaws and a connecting element allowing connection of the first and second clamping jaws so that they clamp the first part or the second part of the bar.

10. An aircraft comprising at least one boom for an electrical harness, the boom comprising:
a straight bar extending in a longitudinal direction and having first and second ends configured so the first and second ends can be removably attached to at least one support during operation, and
several supports distributed along and attached to the bar, to which supports at least one electrical harness is attached in operation,
wherein the bar comprises at least two parts configured to slide relative to one another in the longitudinal direction, a first part of the two parts being attached to the first end and a second part of the two parts being attached to the second end, at least one of the first and second parts comprising a tube having an outer surface provided with longitudinal splines which extend over most of an entire length of the tube and are evenly distributed over its entire circumference.

* * * * *